(12) United States Patent
Wimroither

(10) Patent No.: US 6,462,309 B1
(45) Date of Patent: Oct. 8, 2002

(54) WELDING TORCH

(75) Inventor: Walter Wimroither, Steinbach/Ziehberg (AT)

(73) Assignee: FRONIUS Schweissmaschinen Produktion GmbH & Co. KG, Pettenbach (AT)

( * ) Notice: Subject to any disclaimer, the term of this patent is extended or adjusted under 35 U.S.C. 154(b) by 0 days.

(21) Appl. No.: 09/581,637

(22) PCT Filed: Dec. 10, 1998

(86) PCT No.: PCT/AT98/00301

§ 371 (c)(1), (2), (4) Date: Jul. 24, 2000

(87) PCT Pub. No.: WO99/30863

PCT Pub. Date: Jun. 24, 1999

(30) Foreign Application Priority Data

Dec. 15, 1997 (AU) .............................................. 2114/97

(51) Int. Cl.[7] ................................................. B23K 9/29
(52) U.S. Cl. ................................................. 219/137.51
(58) Field of Search ....................... 219/137.61, 137.44, 219/137.51, 137.52

(56) References Cited

U.S. PATENT DOCUMENTS 3,112,392 A * 11/1963 Orr et al. ............... 219/137.61
3,610,875 A * 10/1971 Molin .................... 219/137.52
4,560,858 A * 12/1985 Manning ................ 219/137.44
4,563,569 A * 1/1986 Shiramizu et al. ..... 219/137.61
4,667,083 A * 5/1987 Stol ....................... 219/137.44
4,731,518 A   3/1988 Parmelee et al.
5,248,868 A   9/1993 Cusick, III

FOREIGN PATENT DOCUMENTS

| CH | 437 573 | 11/1967 |
| DD | 288 771 | 11/1991 |
| DE | 33 30 335 | 3/1985 |
| DE | 89 06 897 | 9/1989 |
| DE | 43 04 318 | 8/1993 |
| GB | 2 074 069 | 4/1981 |

* cited by examiner

Primary Examiner—Clifford C. Shaw
(74) Attorney, Agent, or Firm—Collard & Roe, P.C.

(57) ABSTRACT

The invention describes a welding torch (1), consisting of a main body (2) comprising at least one part, in which a feed device (10) for a welding rod (7) is disposed and which is joined to a connecting piece (21) in order to receive a contact pipe (23). A guide device (32) for the welding rod (7) is being disposed in the feed device (10) extending at an angle in the direction from the connecting piece (21) into the contact pipe (23). A bore (36) for the welding rod (7) and a guide bore (37) of a larger diameter (40) concentric therewith for the guide device (32) is provided in the contact pipe (23), the guide device (32) extending into the guide bore (37) of the contact pipe (23).

26 Claims, 4 Drawing Sheets

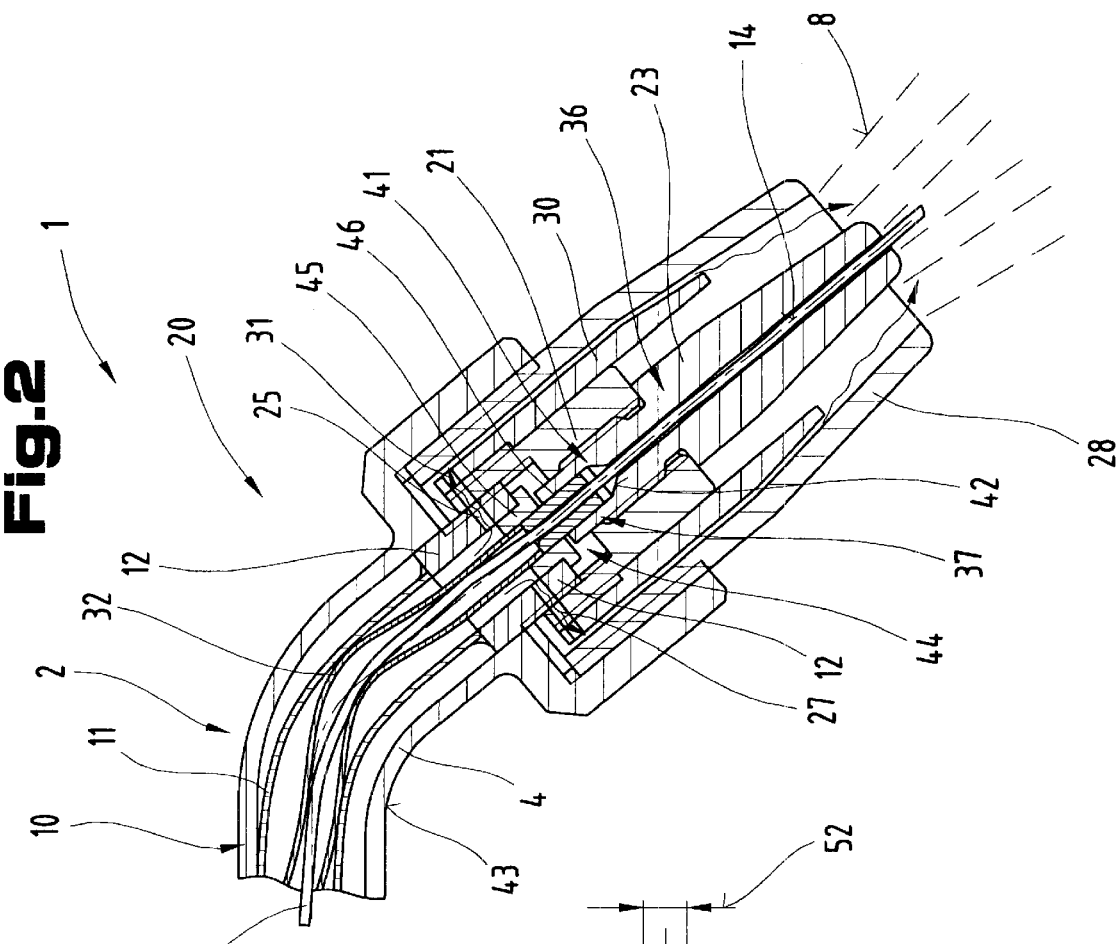
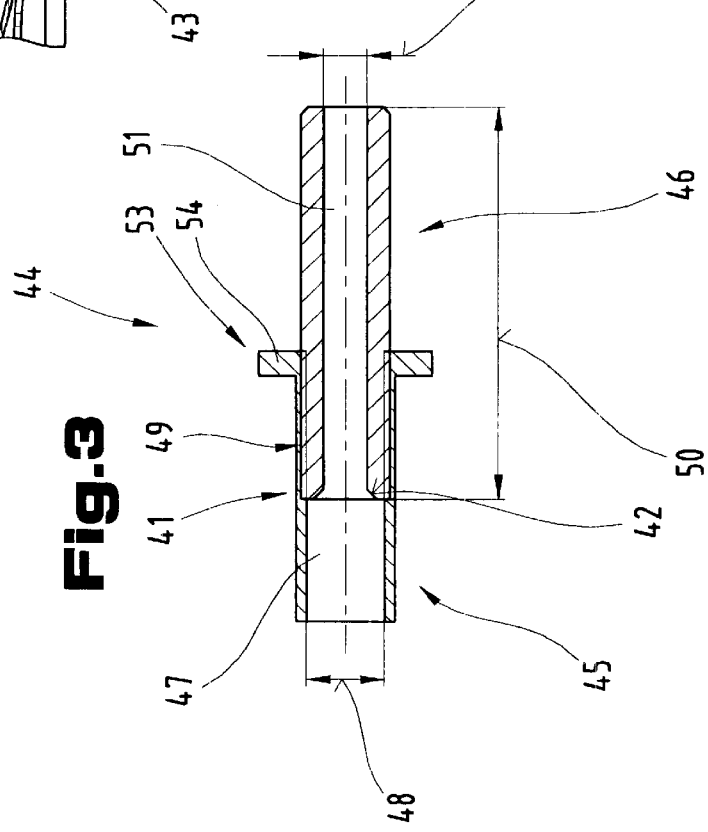

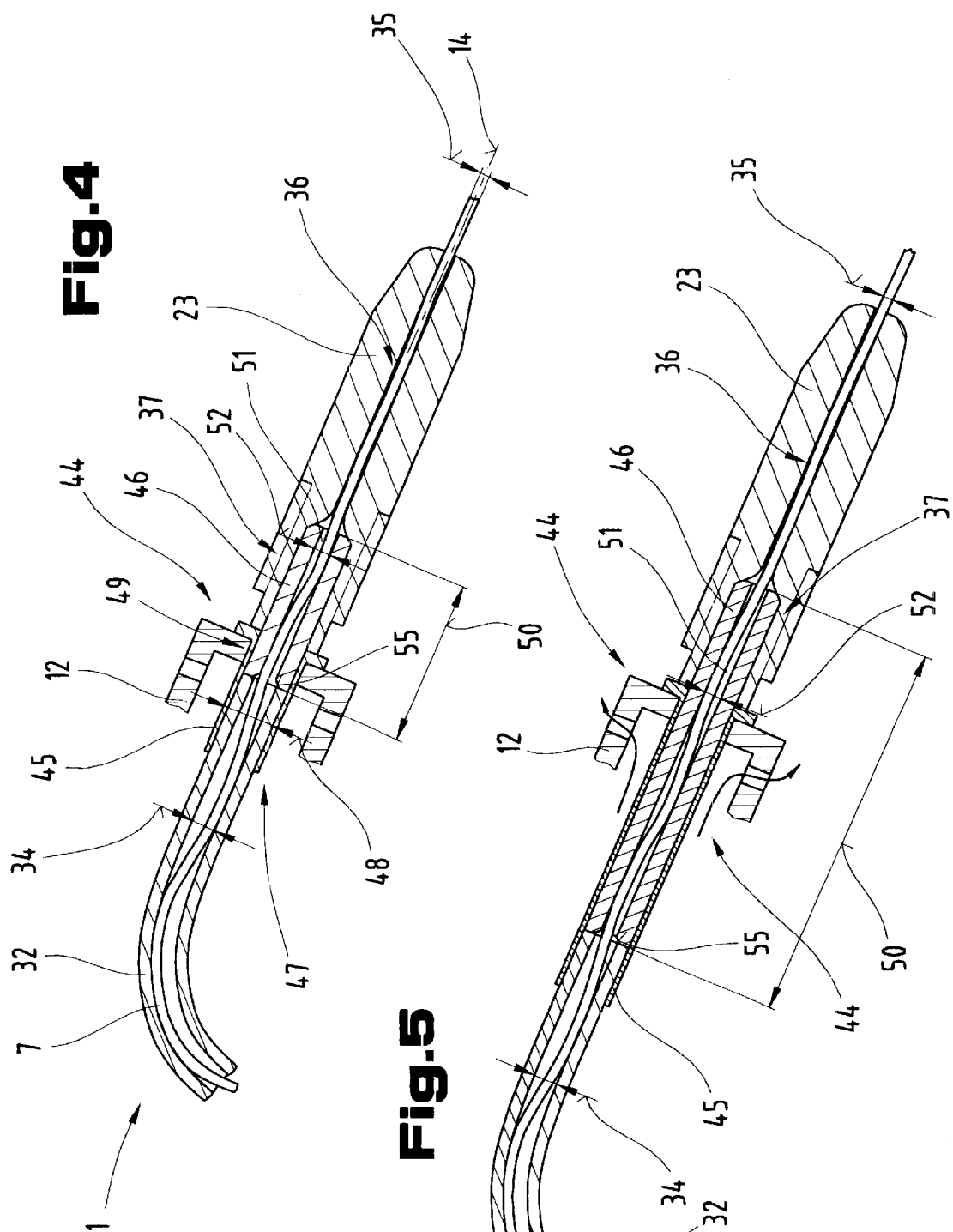

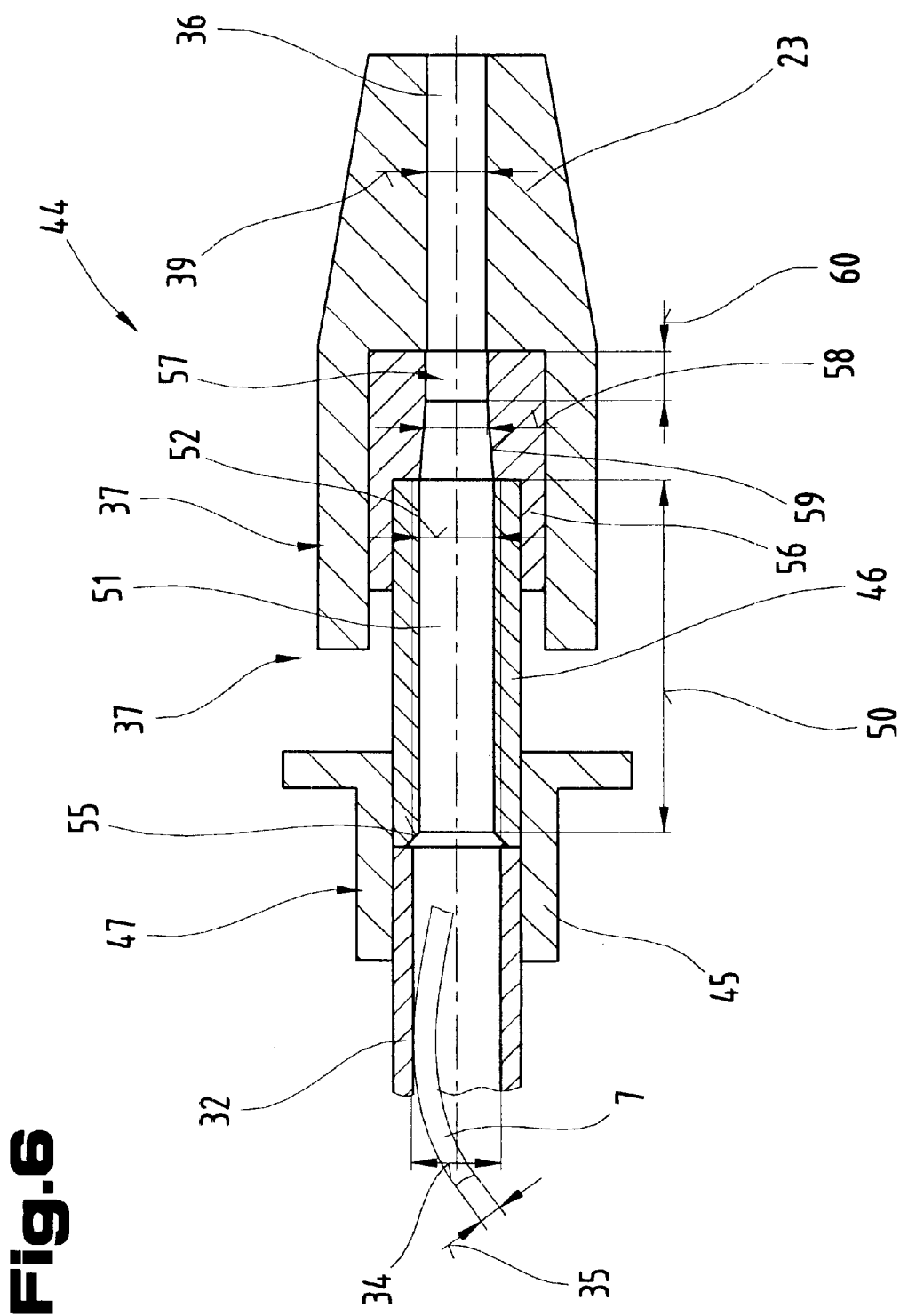

WELDING TORCH

The invention relates to a welding torch comprising a main body, a feed device for a welding rod disposed on the main body and joined to a connecting piece, and a contact pipe received in the connecting piece, the contact pipe having a guide bore.

The invention relates to a welding torch of the type described in the generic part of claims 1 and 2.

Welding torches are already known in which the welding rod is fed to the contact pipe by means of a feed device. These welding torches consist of a main body in which a feed device for a welding rod is arranged. The feed device is joined to a connecting piece which receives the contact pipe. In order to provide a better guiding action for the welding rod, the feed device, which may consist of a copper pipe for example, houses a guide device. To this end, the guide device is designed to have an external diameter smaller than the internal diameter of the feed device. Furthermore, the internal diameter of the guide device more or less corresponds to the external diameter of the welding rod so that the welding rod is accurately guided in the guide device. The guide device extends from the hose pack, which is connected to the welding torch, as far as the contact pipe. The disadvantage of a welding torch of this type is that because the welding rod is fed flexibly through a flexible hose pack for the welding rod, it may have a tendency to develop a flex or bend, preventing the welding rod from being introduced automatically into the contact pipe.

The underlying objective of this invention is to provide a welding torch in which the feeding and placing in contact of the welding rod can be improved.

In a welding torch of the first-described structure, this object is accomplished with a contact pipe which has a bore for the welding rod and in which the guide bore has a larger diameter and is concentric with the bore for the welding rod. The welding torch comprises a guide device for the welding rod disposed in the feed device and extending into the guide bore of the contact pipe and from the connecting piece in a direction away from the contact pipe, the guide device being comprised of a flexible, elastically non-conductive material. The advantage of this system is that the welding rod is fed through a matching bore of the contact pipe producing accurate positioning as it leaves the feed device. Another advantage resides in the fact that because the guide device provides an, accurate guiding action across the length of the bore in the contact pipe, the welding rod can be straightened, in particular to remove any bends in the welding rod, so that the welding rod enters the bore of the contact pipe without kinks, which will at least reduce friction of the welding rod in the bore of the contact pipe. Also, the flexible guide device can adapt to bending in the welding rod, thereby ensuring that the welding rod can be easily guided to the contact pipe without current, thereby preventing any sparking or arcuing in the interior of the welding torch or feed device.

According to another aspect of the invention, a welding torch of the first-described structure comprises a bridging piece in the region of the connecting piece and projecting into the guide bore of the contact pipe, and a guide device for the welding rod disposed in the feed device andextending in the guide bore from the connecting piece in a direction away from the contact pipe, the guide device being connected to the bridging piece.

A guide bore having a larger diameter than that of the bore for the welding rod enables the welding rod to be accurately positioned telative to the contact pipe.

If there is a transition region between the bore for the welding rod and the guide bore, which has a conical taper, the welding rod emerges from the guide device, the welding rod is deflected in a direction towards the bore of the contact pipe because of the conical tapered design, enabling the welding rod to be fed along automatically.

Preferably, the bridging piece is composed of several components of different materials, such as a holder component and a guide component. Such a bridging piece is inexpensive to make since only the parts used to guide the welding rod need to be made from a high quality material, which is preferably highly resistant to friction.

A guide component projecting into the guide bore of the contact pipe offers a simple way of positioning the welding rod accurately for the contact pipe.

If the guide component is preferably threadedly connected to the holder component the guide component of the bridging piece can be readily adapted to suit different welding rods.

The bridging piece is prevented from moving if the holder component has a bearing face in a transition region to the guide component.

The advantage of at least a part of the holder component projecting into the feed device is that the radius of the guide device as it emerges from the feed device is not too small, since it would otherwise be impossible to feed the welding rod to the contact pipe automatically.

If the holder component and the guide device are threadedly connected, the guide device is prevented from working loose from the bridging piece due to pulling and pushing movements of the welding rod.

Resistance can be kept low as the wire is fed through a guide device which has an external diameter preferably 10% to 50% smaller than the internal diameter of the feed device, which is a copper pipe, and an internal diameter at least slightly larger than an external diameter of the welding rod.

A reliable contact of the welding rod with the contact pipe, enabling a transfer of current into the contact pipe, is obtained if the contact pipe bore has a diameter that is slightly larger than an external diameter of the welding rod.

When the welding torch is used with a welding robot, it can be duly positioned to reach weld spots that are not readily accessible if the main body has a curved end section.

The welding time for a welding process can be significantly increased if a cooling device consisting of at least two coolant supply lines is disposed in the main body.

Preferably, the feed device is connected to a source of an inert gas, the feed device and the connecting piece having radially aligned bores in a transition region between the connecting piece and an end region of the feed device so that an inert gas atmosphere is produced within the welding torch or contact pipe, preventing corrosion of the welding torch and its individual components.

The welding rod may be made of a soft metallic material so that, by using the bridging piece in conjunction with an aluminum welding rod having a low natural stiffness, the welding rod can be duly positioned or aligned.

The invention will be described below with reference to examples of embodiments illustrated in the accompanying drawings. Of these:

FIG. 2 is a simplified schematic diagram of a cross section of another embodiment of the welding torch proposed by the invention, seen from a side view;

FIG. 3 is a simplified diagram illustrating details of the bridging piece, seen in cross section from a side view;

FIG. 4 is a simplified schematic diagram showing an example of a different design which may be used for the bridging piece in the welding torch proposed by the invention;

FIG. 5 is a simplified schematic diagram of another embodiment of the bridging piece which may be used with the welding torch proposed by the invention;

FIG. 6 is a simplified schematic diagram of another embodiment of the bridging piece.

Figure 1:
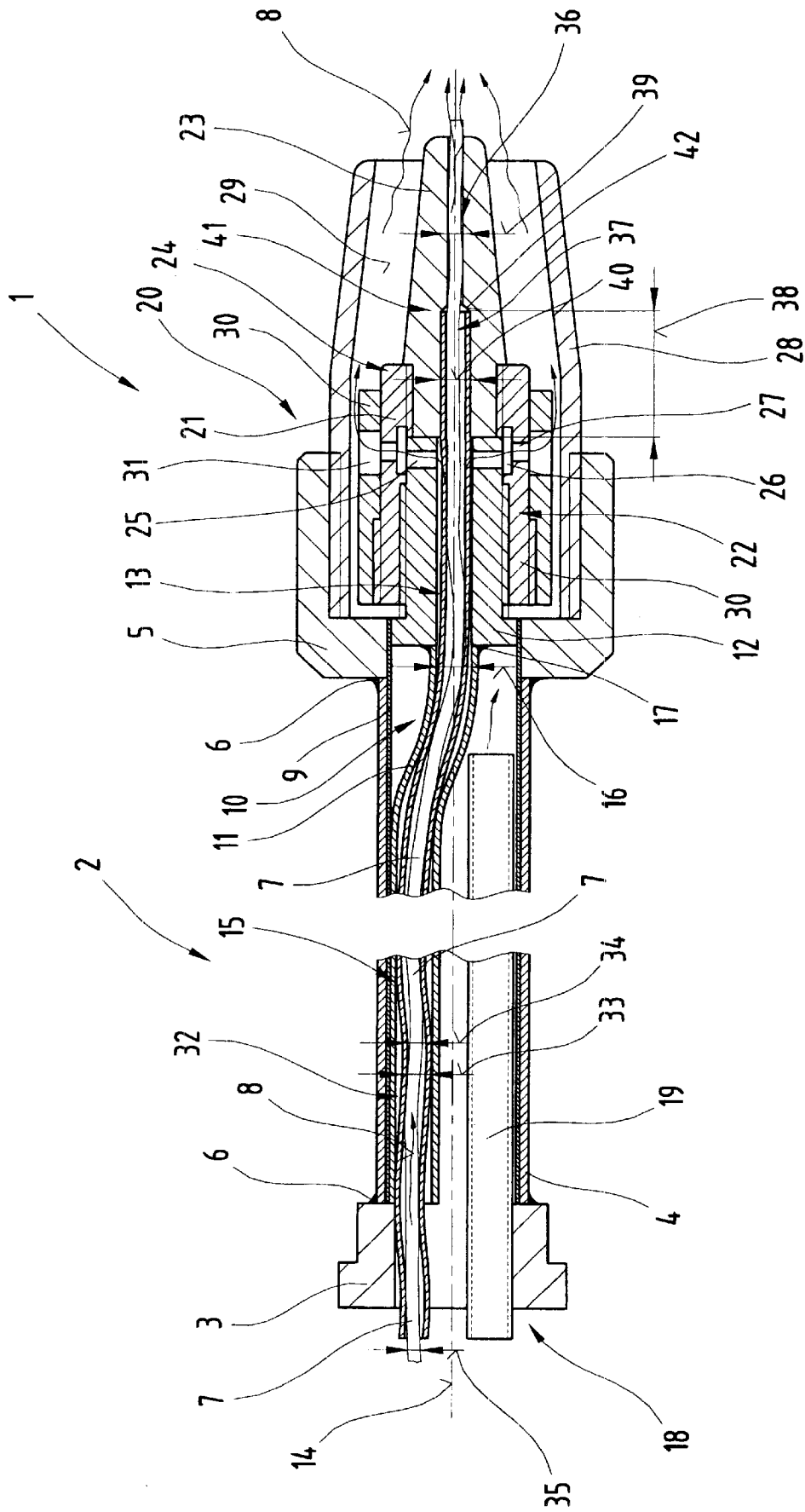
FIG. 1 is a simplified schematic diagram of the welding torch proposed by the invention, shown in cross section from a side view.

Firstly, it should be pointed out that the same parts of the different embodiments described are denoted by the same reference numerals or same component names, which means that disclosures made throughout the description can be transposed in terms of meaning to the same parts with the same reference numerals or component names. The positions referred to in the description, such as top, bottom, side, etc., relate to the drawing specifically being described and, when a different position is being described, can be transposed in terms of meaning to the new position. Furthermore, individual features from the different examples of embodiments illustrated, may deemed to represent solutions proposed by the invention in their own right.

FIG. 1 illustrates a welding torch 1, which might be used for MIG/MAG welding for example, the welding torch 1 in the embodiment illustrated being designed for a welding robot.

The welding torch 1 consists of a main body 2, which may be made from a single component but preferably consists of several parts. In the embodiment illustrated, the main body 2 consists of a connecting piece 3, a middle piece 4 and an end piece 5. The individual parts of the main body 2 are made from brass, for example, and are either welded together or joined to one another by means of individual beads 6. Clearly, it would also possible for any other material to be used for the main body 2. The main body 2 could also have an insulating layer on its external surface in the form of a plastics material.

By means of the connecting piece 3, the welding torch 1 can be connected to a hose pack on a welding device or a current source. The hose pack is used to supply the various additional materials needed for the welding torch 1 such as a welding rod 7, an inert gas 8 and a coolant fluid for cooling the welding torch 1, for example. The welding torch 1 is also supplied with energy via the hose pack, in particular with current and voltage, drawn from the welding device or from the power source.

An insulating layer 9 made from a plastics material for example may be provided inside the main body 2. The purpose of the insulating layer 9 is to isolate the current flowing in the interior of the welding torch 1 from the external surface, in other words from the main body 2, so that the user will not be subjected to an electric shock if he touches the welding torch 1.

The welding torch 1 also has a feed device 10 inside the main body 2, which is made up of a copper pipe 11 and a bridging element 12. The feed device 10 is connected to the connecting piece 3 at one end and to the end piece 5 of the main body 2 at the other end. The copper pipe 11 and the bridging element 12 of the feed device may be joined to the connecting piece 3 and/or the end piece 5 by means of a push-fit, soldering or welding.

The bridging element 12 has a bore 13 running through its centre. In the embodiment of the welding torch 1 illustrated, the bore 13 is arranged in the longitudinal direction of a longitudinal central axis 14 running through the centre of the welding torch 1. Adjoining the bridging element 12 in the direction of the connecting piece 3, the copper piper 11 is connected to the bridging element 12, the copper pipe 11 being connected to the bridging element 12 in such a way that a cavity 15 disposed in the interior of the copper pipe 11 runs concentrically or is aligned with the bore 13 of the bridging element 12, i.e. the copper pipe 11 has an internal diameter 16 which matches the diameter of the bore 13 of the bridging element 12. The copper pipe 11 may be soldered to the bridging element 12, for example, or may joined to the bridging element 12 by means of a bead 17.

In the embodiment illustrated, the copper pipe 11 is designed so that it extends from the middle region, in other words in the longitudinal direction of the longitudinal central axis 14 of the welding torch 1, at an angle in a direction towards the interior face of the main body 2, after which the copper pipe 11 runs parallel with the middle piece 4, in particular parallel with the insulating layer 9, i.e. the copper pipe 11 bends or deflects from the centre position, in particular from the position running along the longitudinal central axis 14 extending in a longitudinal direction, into a position running parallel with the longitudinal central axis 14.

As a result of the bend or deflection from the centre position of the welding torch 1 to a position or point running parallel with the longitudinal central axis 14, a free space is formed inside the main body 2 enabling a cooling device 18 to be arranged in the interior of the main body 2. The cooling device 18 comprises supply pipes 19, although only one of these supply pipes 19 is illustrated in the cross section shown here. By disposing the cooling device 18 in the interior of the main body 2, a coolant can be duly pumped or conveyed through the supply pipe 19 into the interior volume of the welding torch 1, which can then be fed back out of the welding torch 1 by supply pipes 19 not illustrated. The welding torch 1 can be cooled using a circuit design of this type.

Clearly, it would also be possible for the feed device 10 to extend in the longitudinal direction of the welding torch 1, in other words aligned with the longitudinal central axis 14, in which case the individual supply pipes 19 may be arranged parallel with the longitudinal central axis 14.

Provided in an end region 20 of the welding torch 1, in other words in the region of the end piece 5, is a connecting piece 21 disposed in the direction opposite the connecting piece 3. The connecting piece 21 is connected to the bridging element 12 of the feed device 10. To this end, the bridging element 12 may be joined to the connecting piece 21 by means of a thread fitting 22, in which case the bridging element 12 will have an external thread and the connecting piece 21 will have an internal thread so that the connecting piece 21 can be screwed onto the bridging element 12. The purpose of the connecting piece 21 is to receive a contact pipe 23 which will be needed for a welding process. To this end, the connecting piece 21 also has a thread fitting 24 by means of which the contact pipe 23 can be connected or attached to the connecting piece 21. By using a thread fitting 24 to connect the contact pipe 23, the contact pipe 23 can easily be exchanged by the user without the need for an engineer to be present.

In the welding torch 1 illustrated, the inert gas 8 used to produce an inert gas shield in the region of the weld spot is fed via the feed device 10, i.e. the inert gas 8 is fed from the connecting piece 3 via the copper pipe 11 in a direction towards the end region 20 of the welding torch 1, so that an inert gas shield can be produced at the welding point as it leaves the feed device 10. To this end, the bridging element 12 has bores 25 running radially around the longitudinal central axis 14 of the welding torch 1 in the end region 20 of the welding torch 1. Furthermore, a cavity 26 is provided in the connecting piece 21 so that the inert gas 8 can flow from the feed device 10, in particular from the bridging element 12, through the bores 25 into the cavity 26 of the connecting piece 21. To ensure that the inert gas 8 is able to flow from the cavity 26 to the welding point, the connecting piece 21 in is in turn provided with bores 27 running radially around the longitudinal central axis 14. The bores 27 are disposed in the region of the cavity 26 on the connecting piece 21 so that the inert gas 8 can flow from the cavity 26 through the bores 27 and out to the welding point.

In order to concentrate the inert gas 8 around the contact pipe 23 or on the welding point, the welding torch 1 has a gas nozzle 28. The gas nozzle 28 is connected to the end piece 5 of the main body 2 and the gas nozzle 28 may be provided with a thread to provide a connection to the end piece 5. Clearly, it would also be possible for the gas nozzle 28 to be fitted to the end piece 5 of the main body 2 by a simple push-fit arrangement. The gas nozzle 28 is arranged so that the inert gas 8 delivered collects in the interior 29 of the gas nozzle 28 and then flows in the direction of the contact pipe 23, so that an inert gas atmosphere is formed around the contact pipe 23 or the welding point. For this purpose, it would be possible to provide an insulating cap 30 over the connecting piece 21, for example. The insulating cap 30 in turn has bores 31 running radially in the region of the bores 27 of the connecting piece 21. The inert gas 8 is able to flow through these bores 31 from the feed device 10 via the individual bores 25, 27, 31 into the interior 29 of the gas nozzle 28, forming an atmosphere of inert gas accordingly.

The advantage of directing the inert gas 8 through the feed device 10 resides in the fact that in addition to the inert gas 8 flowing out from the bores 25, 27, 31, inert gas 8 is also able to flow through the contact pipe 23 in the direction of the weld spot, again building up an inert gas atmosphere in the interior of the contact pipe and hence preventing any corrosion of the contact pipe 23.

Clearly, it would also be possible to deliver the inert gas 8 by means of additional lines so that an inert gas atmosphere can also be formed in the region of the contact pipe 23.

To enable the welding rod 7 to be fed through the welding torch 1, a guide device 32 for the welding rod 7 is provided in the feed device 10. The guide device 32 is made from an elastic pipe or a coil spring, for example, made from a plastics material. Clearly, it would be possible to use any material exhibiting elastic properties. It would also be possible for the guide device 32 to be made from an electrically non-conductive material, which would allow the welding rod 7 to be fed as far as the welding torch 1 without current. Moreover, the guide device 32 has an external diameter 33 that is smaller or less than the internal diameter 16 of the feed device 10, in particular of the copper pipe 11. In this respect, the external diameter 33 of the guide device 32 may be 10% to 50%, preferably 25% smaller than the internal diameter 16 of the feed device 10.

An internal diameter 34 of the guide device 32 is at least slightly larger than an external diameter 35 of the welding rod 7. By using a design of this type, the guide device 32 can be pushed inside the copper pipe 11 and in the feed device 10. At the same time, the welding rod 7 can be readily conveyed due to the matching layout of the internal diameter 34.

The advantage of this arrangement of guide device 32 is that a welding torch 1 of this type is used for various welding processes requiring the use of different welding rods 7 of varying external diameters 35, which means that a feed device 10 which can not be removed will have to be dimensioned accordingly, particularly in terms of its internal diameter 16. With this system, the user of the welding torch 1 will merely have to change the guide device 32 in order to adapt to the most varied of welding rods 7. Clearly, several welding rods 7 of differing external diameters 35 could be used with an appropriate guide device 32 having a matching internal diameter 34.

In practice, if no guide device 32 were inserted in the feed device 10, faults could occur when inserting or introducing the welding rod 7 in the direction of the contact pipe 23 because of the relatively large internal diameter 16 of the feed device 10 since a large internal diameter 16 of the feed device 10 could cause the welding rod 7 to run or bend accordingly, causing the welding rod 7 to kink in the welding torch 1, thus preventing an automatic feed of the welding rod 7.

The guide device 32 is arranged in the welding torch 1 in such a way that it extends from the connecting piece 3 and the hose pack through the feed device 10, in particular through the copper pipe 11 and the bridging element 12, in a direction towards to the contact pipe 23. This being the case, the contact pipe 23 is designed so that a bore 36 is provided for the welding rod 7 and a guide bore 37 for the guide device 32. The guide bore 37 for the guide device 32 extends across a length 38 from the bridging element 12 in the direction of the bore 36, in particular from the bridging element 12 to the weld point. The difference between the bores 36 and the guide bore 37 of the contact pipe 23 resides in the fact that the bore 36 for the welding rod 7 has a diameter 39 which is slightly larger than the external diameter 35 of the welding rod 7. The diameter 40 of the other guide bore 37 of the contact pipe 23 for the guide device 32 is slightly larger than the external diameter 33 of the guide device 32. As a result, the guide device 32 can be inserted in or pushed into the guide bore 37 of the contact pipe 23 so that the guide device 32 can be accurately positioned relative to the contact pipe 23 across the length 38.

In addition, in a transition region 41 to the bore 36, the guide bore 37 has a conical taper 42 so that there are no sharp edges as the welding rod 7 emerges from the guide device 32 and is transferred to the bore 36 of the contact pipe, enabling the welding rod 7 to be fed in automatically.

Because of the positioning of the guide device 32 or the insertion of the guide device 32 in the contact pipe 23, the welding rod 7 can be exactly positioned across the length 38 to the bore 36 of the contact pipe 23, i.e. the internal diameter 34 of the guide device 32 is kept positioned flush with or in alignment with the bore 36 of the contact pipe 23 and the welding rod 7 can be fed or conveyed accurately from the guide device 32 to the bore 36 of the contact pipe 23. This arrangement of the guide device 32 also means that if the guide device 32 is made from an elastic, non-electrically conductive material, such as plastics for example, the current will not cross over until the region of the contact pipe 23. This is an advantage in that if there is sparking or arcing, there will be no loss of power due to the short length of the welding rod 7 across which energy is carried.

Clearly, it would also be possible for the current to be conveyed with the welding rod 7 actually in the welding torch 1, in other words in the feed device 10. It would also he conceivable to apply energy to the welding rod 7 as far back as the welding device or at the current source so that current would be carried from the welding device to the welding torch 1 through the welding rod 7.

Another advantage of designing the welding torch 1 so that the guide device 32 is positioned in the contact pipe 23, particularly if the guide device 32 is inserted in the guide bore 37 of the 3contact pipe 23, is that when using a welding rod 7 made from a readily deformable material, as would be the case with an aluminium welding wire for example, the welding rod 7 would be susceptible to kinks as it is fed through the hose pack which would make it impossible to feed or weld without being able to position the welding rod 7 exactly as it emerges from the guide device 32 and enters the bore 36 of the contact pipe 23 since sharp edges could be formed if the differences in the diameters of the individual components were too great.

In the embodiment as illustrated in FIG. 1, the individual components of the welding torch 1 are preferably rounded.

FIG. 2 illustrates another embodiment of the welding torch 1 proposed by the invention. In this embodiment, only the end region 20 of the welding torch 1 is illustrated. In this case, the welding torch 1 is bent or angled, i.e. the middle piece 4 of the main body 2 has a radius 43 in the region 20 of the welding torch 1.

The welding torch 1 is of the same construction as that illustrated in FIG. 1 but no insulating layer 9 is provided between the main body 2 and the feed device 10, in particular the copper pipe 11. The welding torch 1 essentially consists of the same components but the shape of the individual components may be different, i.e. the welding torch 1 comprises the feed device 10, consisting of the copper pipe 11 and the bridging element 12, as well as the connecting piece 21 and the contact pipe 23 joined to the connecting piece 21. As illustrated, the gas in this embodiment is again delivered to the welding torch 1 via the feed device 10 and accordingly the bores 25 in the bridging element 12 are radially disposed and the bores 27 in the connecting piece 21 are radially disposed relative to the longitudinal central axis 14 of the welding torch 1 so that the inert gas 8 can escape through the bores 25, 26 and the bore 31 of the insulating cap 30. The inert gas 8 is then collected by means of the gas nozzle 28 in the welding region, in other words around the contact pipe 23, therefore forming an inert gas atmosphere in the welding region.

The only difference as compared with the embodiment illustrated in FIG. 1 is that the guide device 32 is not inserted in the guide bore 37 of the contact bush 23 as illustrated in FIG. 1 but instead a bridging piece 44 is arranged between the guide device 32 and the contact bush 23. The bridging piece 44 may be made in one piece although the bridging piece 44 in the embodiment illustrated is made from two parts. In this case, the bridging piece 44 has a holder component 45 and a guide component 46.

The bridging piece 44 is designed so that the guide device 32 projects into the holder component 45, the guide component 46 in this case being positioned in the guide bore 37 of the contact bush 23. The bridging piece 44, in particular the holder component 45, projects, at least across a part, into the guide device 10 of the welding torch, producing a firm seat for the holder component 45 on the feed device 10. For this purpose, the bridging piece 44, in particular the holder component 45 and the guide component 46, are designed to have different bores, on the one hand for the guide device 32 and on the other hand for the welding rod 7. The bridging piece 44 will be described in more detail with reference to FIG. 3.

The purpose of the bridging piece 44 is to ensure that the welding rod 7 is accurately positioned relative to the contact bush 23, in particular relative to the bore 36 of the contact bush 23. The advantage of the design used for the bridging piece 44 resides in the fact that the welding rod 7, which is fed through the feed device 32 into the guide component 46 of the bridging piece 44, is duly aligned by means of this guide component 46, i.e. the welding rod 7 becomes duly misaligned because of the radius 43 of the welding torch 1 and the flexibly running guide device 32 and the welding rod 7 is then straightened or re-aligned by means of the guide component 46 so that it can enter the bore 36 of the contact pipe 23 with relatively little misalignment.

For this reason, the guide component 46 may have a conical taper 42 in the transition region 41 between the holder component 45 and the guide component 46, i.e. the guide component 46 has a conical taper 42 so that, as the welding rod 7 leaves the guide device 32 and enters the bore of the guide component 46, the welding rod is deflected by means of the conically extending taper 42 in the direction of the bore of the guide component 46 so that it can enter the guide component 46 without giving rise to any problems.

If the bridging piece 44 is made from two parts, the holder component 45 may be made from copper whilst the guide component 46 may be made from wear-resistant materials. The guide component 46 may be made from an electrically non-conductive, highly friction-resistant material, for example, so that there is no wear on the guide component 46 and the welding rod 7 is not damaged due to the action of aligning the welding rod 7 in the guide component 46. Another advantage of using a guide component 46 made from a non-conductive material is that current or energy is not applied to the welding rod 7 until it reaches the contact pipe 23, preventing any short-circuiting in the region of the guide component 46 or in the welding torch 1.

FIG. 3 illustrates a side view of the bridging piece 44 in cross section. The bridging piece 44 again comprises the holder component 45 and the guide component 46.

As may be seen from FIG. 3, the bridging piece 44 has a guide bore 47 with a diameter 48. The holder component 45 is also provided with a thread fitting 49 across a part-region of the guide bore 47 or across the entire guide bore 47, in particular an internal thread.

The guide component 46 is provided in the form of a tubular member and also has a thread across a part-region of its length 50 so that the guide component 46 can be screwed into the guide bore 47 of the holder component 45. The guide component 46 in turn has a bore 51 in the longitudinal direction of the bridging piece 44 with a diameter 52 but the diameter 48 of the guide bore 47 for the guide device 32 is larger than the diameter 52 of the bore 51 in the bridging piece 44 for the welding rod 7. Providing the thread fitting 49 means that the bridging piece 44 can be made from various materials. In this respect, it is preferable if the holder component 45 is made from copper and the guide component 46 is made from a highly friction-resistant, preferably nonconductive material.

In the transition region between the holder component 45 and the guide component 46, the bridging piece 44 also has a raised portion 53, in particular a bearing face 54. The purpose of the bearing face 54 is that when the bridging piece 44 is positioned on the bridging element 12, the latter is able to penetrate the bore 13 of the bridging element 12 by means of the holder component 45, in particular by means of the external face of the holder component 45, so that the bearing face 54 provides support for the bridging piece 44. At the same time, the bearing face 54 has another function in that when the welding rod 7 is being displaced in the direction of the contact pipe 23, the bearing face 54 bears against the contact pipe 23 preventing the guide component 46 from penetrating the guide bore 37 of the contact bush 23 too far.

The bridging piece 44, in particular the diameter 48 of the guide bore 47 of the holder component 45, is so dimensioned that the guide device 32 is able to penetrate the guide bore 47 of the holder component 45 so that a firm seat is provided for the holder element 45 and the bridging piece 44 on the guide device 32. The diameter 52 of the bore 51 of the guide component 46 is designed to be slightly larger than the external diameter 35 of the welding rod 7 so that as the welding rod 7 enters the bore 51 of the bridging piece 44, the welding rod 7 is aligned accordingly.

The alignment of the welding rod 7 can be controlled as a result of the dimensions of the length 50 of the guide component 46, i.e. due to the length 50 of the guide component 46, the welding rod 7 can be variably aligned so that a longer length 50 of the welding rod 7 can be re-aligned than would be the case if the guide component 46 were of a shorter length 50.

Clearly, it would also be possible for the bridging piece 44 to be of any shape. For example, the bridging piece 44, in particular the holder component 45, might have two different guide bores 47, in which case one guide bore 47, in particular the guide bore 47 in which the guide device 32 is inserted, will have a diameter 48 matching the external diameter 33 of the guide device 32. The other guide bore 47 may be of a larger diameter 48, for example, so that the guide component 46 may be larger in size. To do this, however, the guide bore 37 must be adapted to the appropriate diameter of the guide component 46 at the contact bush 23.

FIGS. 4 and 5 illustrate another embodiment of the welding torch 1 with the bridging piece 44. In the embodiment illustrated here, only the contact pipe 23 connected to the bridging piece 44 and the connection between bridging piece 44 and the bridging element 12 are shown.

As may be seen more clearly from FIG. 4, the guide device 32 is inserted in the guide bore 47 of the holder component 45. For this purpose, an internal thread may be provided in the guide bore 47, for example, by means of which the guide device 32 can be screwed onto a thread arranged on its external circumference. By connecting the guide device 32 to the bridging piece 44 by means of a thread fitting, the guide device 32 can be firmly seated on the holder component 45, preventing the guide device 32 and the bridging piece 44 from coming loose of their own accord as the welding rod 7 is subjected to pushing movements or if the welding rod 7 is pulled. The guide component 46 is in turn screwed into the guide bore 47 of the holder component 45 by means of the thread fitting 49, the cross section of the guide for the welding rod 7 being reduced, i.e. a transition is provided in the guiding action of the welding rod 7 between the internal diameter 34 of the guide device 32 and the diameter 52 of the bore 51 of the guide component 46. Reducing the cross section ensures that any misalignment occurring as the welding rod 7 is fed across the length 50 of the guide component 46 is redressed, i.e. the welding rod 7 is re-aligned across the length 50 ensuring that the welding rod 7 is fed accurately into the bore 36 of the contact pipe 23.

To provide a smooth transition from the internal diameter 34 of the guide device 32 to the diameter 52 of the bore 51 of the guide component 46, the end region of the guide component 46, in other words the contact region between the guide component 46 and the guide device 32, is provided with a taper 55 running conically relative to the longitudinal central axis 14 of the welding torch 1. This results in an edge-free transition to the guide component 46 as the welding rod 7 is fed out of the guide device 32 so that, as it arrives at the taper 55, the welding rod 7 is steered automatically or of its own accord into the bore 51 of the guide component 46, after which the welding rod 7 is aligned or straightened across the length 50 of the guide component 46.

The dimension of the diameter 52 of the bore 51 of the guide component 46 is such that it acts to adjust, in particular align the welding rod 7, i.e. the size of the diameter 52 relative to the external diameter 35 of the welding rod 7 can be used as a means of predetermining the alignment of the welding rod 7, thereby ensuring that in the contact pipe 23, the welding rod 7 will make perfect contact with the surface of the bore 36 of the contact pipe 23 ensuring that current will pass through in the region of the contact pipe 23.

FIG. 5 illustrates another field of application and another embodiment of the bridging piece 44. The guide device 32 is again inserted in the holder component 45 but in this case the holder component 45 is not screwed in as illustrated in FIG. 4 but is connected to the guide device 32 by a push-fit, again producing a firm and solid seat between the guide device 32 and the holder component 45. In the embodiment illustrated in FIG. 5, the guide component 46 is designed to have an appropriate length 50 for aligning the welding rod 7, this length 50 being such that it can impart an aligning action to the welding rod 7.

In this case, the diameter 52 of the bore 51 of the guide component 46 is not the decisive means by which the guide component 46 aligns the welding rod 7, as was the case with the embodiment illustrated in FIG. 4, and instead the length 50 of the guide component 46 effects the alignment of the welding rod 7, i.e. because the welding rod 7 is fed in the guide component 46 over a longer stretch and more accurately, the welding rod 7, in particular the alignment of the welding rod 7, is corrected so that as the welding rod 7 leaves the guide component 46 it follows an almost straight course allowing it to be accurately fed through the bore 36 of the contact pipe 23.

In this embodiment, however, the cross section is also reduced as a means of adjusting the course of the welding rod 7, i.e. the internal diameter 34 of the guide device 32 is reduced to a diameter 52 the same as the bore 51 although the bore 51 and its diameter 52 do not have to match the external diameter 35 of the welding rod 7 exactly since the aligning or straightening action is imparted to the welding rod 7 across the corresponding length 50 of the guide component 46 so that a bridging piece 44 can be inserted to cater for different welding rods 7 of differing external diameters 35, for example.

The embodiments described above in respect of FIGS. 4 and 5 may be used for welding rods 7 which have an inherently high degree of stiffness or for a welding rod 7 made from a slightly flexible material with a low natural stiffness, as is the case with an aluminium welding rod, for example. With welding rods 7 of this type, the process of feeding from the welding rod roll to the welding torch 1 via the hose pack and then through the guide device 32 to the contact pipe 23 imparts a kink to the welding rod 7 accordingly because the welding rod 7 tends to conform to the flexing variations in the hose pack and the guide device 32 as well as the angled design of the welding torch 1 as it passes through the hose pack.

Providing the bridging piece 44 has an advantage because inserting the bridging piece 44 aligns the welding rod 7 before it is fed into the contact bush 23, thereby ensuring that the welding rod 7 is accurately positioned and guided. Another advantage is to be gained if the guide device 32 is made from a non-conductive material and the bridging piece 44 is made in two parts, the guide component 46 being made from a non-conductive material, because the welding rod feed requires no current and current will not pass into the welding rod 7 until it enters the contact pipe 23 or leaves the contact pipe 23, preventing any losses in power which would occur if the current were fed via the welding rod 7. Another advantage of feeding the welding rod 7 to the contact pipe 23 without current is that sparking can be avoided in the interior of the welding torch 1 and in the hose pack, preventing the welding rod 7 from fusing in the interior of the welding torch 1, which means that a welding process can be applied for a longer period using a welding torch 1 of this type.

Clearly, it would also be possible to use a welding torch 1 of this design as a hand-welder, i.e. the bridging piece 44 and the guide device 32 feeding into the contact pipe 23 can also be used with a hand-welder.

FIG. 6 illustrates another embodiment of the bridging piece 44 in cross section from a side view. As described with reference to FIGS. 4 and 5, only the key components used to connect the bridging piece 44 to the contact pipe 23 and the guide device 32 are illustrated.

In the embodiment illustrated here, the bridging piece 44 is not made of just two parts but consists of several parts, in particular three parts, and again a connection is provided for the guide device 32 of the holder component 45. The guide component 46 is again inserted in or screwed into the holder component 45, the cross section being reduced from the guide device 32 to the guide component 46, i.e. there is a reduction in cross section from the internal diameter 34 of the guide device 32 to a diameter 52 of the bore 51 of the guide component 46.

Another guide component 56 is then connected to the guide component 46 by means of an external thread, for example. The guide component 56 in turn has a bore 57 extending in the longitudinal direction of the welding torch 1 and the bore 51 of the guide component 46, with a diameter 58. The diameter 58 of the bore 57 is smaller than the diameter 52 of the bore 51, producing a further reduction in the cross section guiding the welding rod 7.

In order to ensure a friction-free or edge-free transition from the bore 51 to the bore 57, a conically extending taper 59 may be provided in the transition region from the guide component 46 to the guide component 56. The contact pipe 23 is then arranged adjoining the guide component 56, i.e. this time it is the guide component 56 which is placed or inserted in the guide bore 37 of the contact pipe 23 to provide accurate guidance from the exit of the bore 57 of the guide component 56 to the contact pipe 23.

In the embodiment illustrated, the cross section is adapted in a stepped design in order to guide the welding rod 7 onto the bore 36 of the contact bush 23, i.e. the stepped reduction in cross section aligns the welding rod 7 across the bridging piece 44.

Another advantage of adapting the cross section to the bore 36 using a stepped design is that if using different welding rods 7 of varying external diameters 35, it is not necessary to change the entire bridging piece 44 to use a different welding rod 7 of another external diameter 35 and instead only guide component 56 needs to be replaced in order to adapt to the different external diameter 35 of the welding rod 7.

By pre-aligning the welding rod 7 by means of the guide component 46, the guide component 56, in particular the bore 57, used to provide accurate alignment of the welding rod 7, can be of a length 60 which is shorter than the length 50 of the guide component 46. This is possible because the welding rod 7 has already been pre-aligned across the length 50 of the guide component 46 and only a short length 60 will be needed to ensure perfect positioning.

As with the drawings described above, the bridging piece 44 may be made from a single piece rather than providing a bridging piece 44 made from several individual parts.

Clearly, instead of the bridging piece 44, the guide device 32 could have an internal diameter 34 of the guide device 32 that is reduced in cross section at the end region, in other words in the transition region to the contact pipe 23, the welding rod 7 again being aligned by means of this taper. For this purpose, to provide a tapering design of the guide device 32, this piece, in other words the tapered piece, could be pushed into the contact pipe 23, in which case the guide bore 37 would match the diameter of the guide device 32.

If the guide device 32 is made from a plastics material in the transition region to the contact pipe 23, it would also be possible to provide a metal sheath so that the guide device will run in a straight line in the area where the metal sheath is pushed onto the guide device 32 in order to align the welding rod 7 in this region.

Finally, for the sake of good order, it should be pointed out that the individual components and groups of components illustrated in the drawings are shown out of proportion and on a distorted scale in order to provide a clearer understanding of the invention.

Above all, the individual embodiments illustrated in FIGS. 1; 2; 3; 4; 5; 6 represent independent solutions to the invention in their own right. The objectives sought by the invention and the solutions proposed can be found in the detailed description of these drawings.

List of Reference Numerals 1 welding torch
2 main body
3 connecting piece
4 middle piece
5 end piece
6 bead
7 welding rod
8 inert gas
9 insulating layer
10 feed device
11 copper pipe
12 bridging element
13 bore
14 longitudinal central axis
15 cavity
16 internal diameter
17 bead
18 cooling device
19 supply pipe
20 end region
21 connecting piece
22 thread fitting
23 contact pipe
24 thread fitting
25 bore
26 cavity
27 bore
28 gas nozzle
29 interior
30 insulating cap
31 bore
32 guide device
33 external diameter
34 internal diameter
35 external diameter 36 bore
37 guide bore
38 length
39 diameter
40 diameter
41 transition region
42 taper
43 radius
44 bridging piece
45 holder component
46 guide component
47 guide bore
48 diameter
49 thread fitting
50 length
51 bore
52 diameter
53 raised portion
54 bearing face
55 taper
56 guide compartment
57 bore
58 diameter
59 taper
60 length

What is claimed is:

1. A welding torch comprising
   (a) a main body,
   (b) a feed device for a welding rod disposed in the main body and joined to a connecting piece,
   (c) a contact pipe received in the connecting piece, the contact pipe having
      (a) a bore for the welding rod and
      (b) a guide bore of a larger diameter and concentric with the bore for the welding rod, and
   (d) a guide device for the welding rod disposed in the feed device and extending into the guide bore of the contact pipe and from the connecting piece in a direction away from the contact pipe, the guide device being comprised of a flexible, electrically non-conductive material.

2. The welding torch of claim 1, wherein a transition region between the bore for the welding rod and the guide bore has a conical taper.

3. The welding torch of claim 1, wherein the guide device is comprised of a plastics material or a material with elastic properties.

4. The welding torch of claim 1, wherein the feed device is a copper pipe.

5. The welding torch of claim 1, wherein the guide device has an external diameter smaller than an internal diameter of the feed device and an internal diameter at least slightly larger than an external diameter of the welding rod.

6. The welding torch of claim 5, wherein the external diameter of the guide device is 10% to 50% smaller than the internal diameter of the feed device.

7. The welding torch of claim 1, wherein the contact pipe bore has a diameter that is slightly larger than an external diameter of the welding rod.

8. The welding torch of claim 1, wherein the main body has a curved end section.

9. The welding torch of claim 1, comprising a cooling device consisting of at least two coolant supply lines disposed in the main body.

10. The welding torch of claim 1, wherein the feed device is connected to a source of an inert gas, the feed device and the connecting piece having radially aligned bores in a transition region between the connecting piece and an end region of the feed device.

11. The welding torch of claim 1, wherein the welding rod is made of a soft metallic material.

12. A welding torch comprising
    (a) a main body,
    (b) a feed device for a welding rod disposed in the main body and joined to a connecting piece,
    (c) a contact pipe received in the connecting piece, the contact pipe having a guide bore,
    (d) a bridging piece in the region of the connecting piece and projecting into the guide bore of the contact pipe, and
    (e) a guide device for the welding rod disposed in the feed device and extending in the guide bore from the connecting piece in a direction away from the contact pipe, the guide device being connected to the bridging piece.

13. The welding torch of claim 12, wherein the bridging piece has a bore for the welding rod and a guide bore for the guide device.

14. The welding torch of claim 13, wherein the guide bore has a diameter that is larger than a diameter of the bore for the welding rod.

15. The welding torch of claim 13, wherein a transition region between the guide bore for the guide device and the bore for the welding rod has a conical taper.

16. The welding torch of claim 12, wherein the bridging piece is composed of several components.

17. The welding torch of claim 16, wherein the bridging piece comprises a holder component and a guide component.

18. The welding torch of claim 17, wherein the holder component and the guide component are made of different materials.

19. The welding torch of claim 17, wherein the guide component projects into the guide bore of the contact pipe.

20. The welding torch of claim 19, wherein the guide bore has a diameter that is slightly larger than an external diameter of the guide component.

21. The welding torch of claim 17, wherein the guide component has a diameter that is slightly larger than an external diameter of the welding rod.

22. The welding torch of claim 17, wherein the guide component is connected to the holder component.

23. The welding torch of claim 22, wherein the guide component is threadedly connected to the holder component.

24. The welding torch of claim 17, wherein the holder component has a bearing face in a transition region to the guide component.

25. The welding torch of claim 17, wherein at least a part of the holder component projects into the feed device.

26. The welding torch of claim 17, wherein the holder component and the guide device are threadedly connected.

* * * * *

UNITED STATES PATENT AND TRADEMARK OFFICE
CERTIFICATE OF CORRECTION

PATENT NO.      : 6,462,309 B1
DATED           : October 8, 2002
INVENTOR(S)     : W. Wimroither It is certified that error appears in the above-identified patent and that said Letters Patent is hereby corrected as shown below:

<u>Title page,</u>
Item [30], Foreign Priority Data, should read:
 -- Dec. 15, 1997  (AT) …………....A 2114/97 --.

Signed and Sealed this

Twentieth Day of May, 2003

JAMES E. ROGAN
*Director of the United States Patent and Trademark Office*